(12) United States Patent
Doll et al.

(10) Patent No.: US 7,963,542 B2
(45) Date of Patent: Jun. 21, 2011

(54) MODULAR CART FOR A GAS TURBINE ENGINE

(75) Inventors: Daniel James Doll, Poway, CA (US); Jason Michael Robertson, San Diego, CA (US); Antonio Acuña, Tijuana (MX)

(73) Assignee: Solar Turbines Incorporated, San Diego, CA (US)

( * ) Notice: Subject to any disclaimer, the term of this patent is extended or adjusted under 35 U.S.C. 154(b) by 46 days.

(21) Appl. No.: 12/230,530

(22) Filed: Aug. 29, 2008

(65) Prior Publication Data
US 2010/0052288 A1    Mar. 4, 2010

(51) Int. Cl.
*B62D 53/04*    (2006.01)
(52) U.S. Cl. ..................... 280/404; 280/405.1
(58) Field of Classification Search .......... 280/404, 280/404.1, 411; 212/180; 73/116.02; 269/17
See application file for complete search history.

(56) References Cited

U.S. PATENT DOCUMENTS

| | | | |
|---|---|---|---|
| 2,921,784 A * | 1/1960 | Miller .............................. 269/17 |
| 3,850,419 A | 11/1974 | Craig |
| 3,949,976 A | 4/1976 | Cofer |
| 4,177,978 A | 12/1979 | Warsaw |
| 4,412,774 A | 11/1983 | Legrand et al. |
| 4,440,265 A | 4/1984 | Spagnoli |
| 4,660,696 A | 4/1987 | Kusaka |
| 4,793,592 A | 12/1988 | Green et al. |
| 5,127,663 A * | 7/1992 | Whitehead ..................... 280/404 |
| 5,171,035 A * | 12/1992 | Brown ........................... 280/442 |
| 5,383,652 A | 1/1995 | Van Den Berg |
| 5,722,512 A | 3/1998 | Lilja et al. |
| 5,829,605 A * | 11/1998 | Poitras ......................... 212/180 |
| 5,870,824 A * | 2/1999 | Lilja et al. .................... 29/889.1 |
| 6,000,903 A | 12/1999 | Hatch et al. |
| 6,095,746 A | 8/2000 | Bergin |
| 6,170,141 B1 | 1/2001 | Rossway et al. |
| 6,298,536 B1 | 10/2001 | Rossway et al. |
| 6,591,665 B2 * | 7/2003 | Sondey ....................... 73/116.02 |
| 7,270,297 B2 | 9/2007 | Schaefer et al. |
| 7,597,184 B1 * | 10/2009 | Vinson ........................ 198/463.1 |
| 7,726,182 B1 * | 6/2010 | Newlin et al. ............. 73/116.02 |
| 2003/0062663 A1 * | 4/2003 | Fox ................................... 269/17 |
| 2006/0113435 A1 * | 6/2006 | Nikolic ....................... 248/122.1 |
| 2007/0033795 A1 | 2/2007 | McCaffrey et al. |
| 2008/0296469 A1 * | 12/2008 | Mainville et al. ............. 248/554 |

* cited by examiner

*Primary Examiner* — Paul N Dickson
*Assistant Examiner* — Tashiana Adams
(74) *Attorney, Agent, or Firm* — Finnegan, Henderson, Farabow, Garrett & Dunner LLP (57) ABSTRACT

A modular cart for a gas turbine engine is disclosed. The modular cart may have a first cart with a first connection portion and a first mounting location. The modular cart may further have a second cart with a second connection portion and a second mounting location. The first connection portion of the first cart may be configured to attach to the second connection portion of the second cart. The modular cart may also have a cart component configured to interchangeably mount to either the first mounting location of the first cart or to the second mounting location of the second cart.

20 Claims, 7 Drawing Sheets

MODULAR CART FOR A GAS TURBINE ENGINE

TECHNICAL FIELD

The present disclosure relates generally to a modular cart and, more particularly, to a modular cart for transporting a gas turbine engine (GTE).

BACKGROUND

Many power systems include a GTE and a power load assembly. The GTE typically includes a compressor section, a combustor section, and a turbine section. The power load assembly is drivingly connected to the GTE and is known to include, for example, a pump, a compressor, or an electric generator. Various configurations of support systems are employed to support the GTE and the power load assembly of such power systems during operation. In some such power systems, the GTE is mounted to a common, stationary support structure.

Various operations involving installing or removing the GTE or sections thereof from the stationary support structure may require transporting one or more sections of the GTE. Many repair operations may involve separating sections of the GTE from one another, which may require removing the GTE from the stationary support structure. For example, replacing a damaged section of the GTE may require removing the GTE from the stationary support structure, separating the damaged section from the other sections, installing a replacement section, and reassembling the sections of the GTE. When the GTE is off of its stationary support structure, supporting and maneuvering the heavy, unwieldy sections of the GTE when separating and reassembling them may be quite difficult.

It is known to transport a GTE on an engine cart. An engine cart allows the GTE to be transported from a first location to a second location, for example, between an operation location mounted on a stationary support structure and a repair location. When repair is needed, it is known to employ a single engine cart to transport the GTE from the operation location to a transport vehicle, such as a truck or an airplane. However, a single engine cart that is large enough to transport the entire GTE may not be well suited to transport a subset of the GTE, such as its power turbine section. It is also known to utilize a plurality of carts to transport one or more sections of an engine.

One example of a multi-cart system for transporting an engine is described in U.S. Pat. No. 5,870,824 to Lilja (the '824 patent). The '824 patent discloses an engine transportation apparatus having three major subcomponents, including a shipping stand, a fan dolly, and a fan shipping frame. Each of the three major subcomponents has wheels or casters to aid movement of the subcomponent. The shipping stand enables a jet aircraft engine to be transported in either a truck transport mode or an air transport mode. The fan dolly and the fan shipping frame are configured for transporting the fan section of the engine. The system disclosed by the '824 patent also includes a train assembly including mating rails on the fan dolly and the fan shipping frame for transferring the fan section of the engine from the fan dolly to the fan shipping frame.

Although the transportation system of '824 patent may alleviate some of the problems associated with transporting engines by using a plurality of carts, the system may be inefficient and overly complex.

SUMMARY

In one aspect, the present disclosure is directed to a modular cart for a gas turbine engine. The modular cart may include a first cart with a first connection portion and a first mounting location. The modular cart may further include a second cart with a second connection portion and a second mounting location. The first connection portion of the first cart may be configured to attach to the second connection portion of the second cart. The modular cart may also include a cart component configured to interchangeably mount to either the first mounting location of the first cart or to the second mounting location of the second cart.

In another aspect, the present disclosure is directed to a method of transporting a gas turbine engine. The gas turbine engine may include a first section separable from a second section. The method may include converting a first cart and a second cart into a combined cart by attaching the first cart to the second cart. The method may further include transporting the first section of the gas turbine engine and the second section of the gas turbine engine on the combined cart.

DETAILED DESCRIPTION

Figure 1:
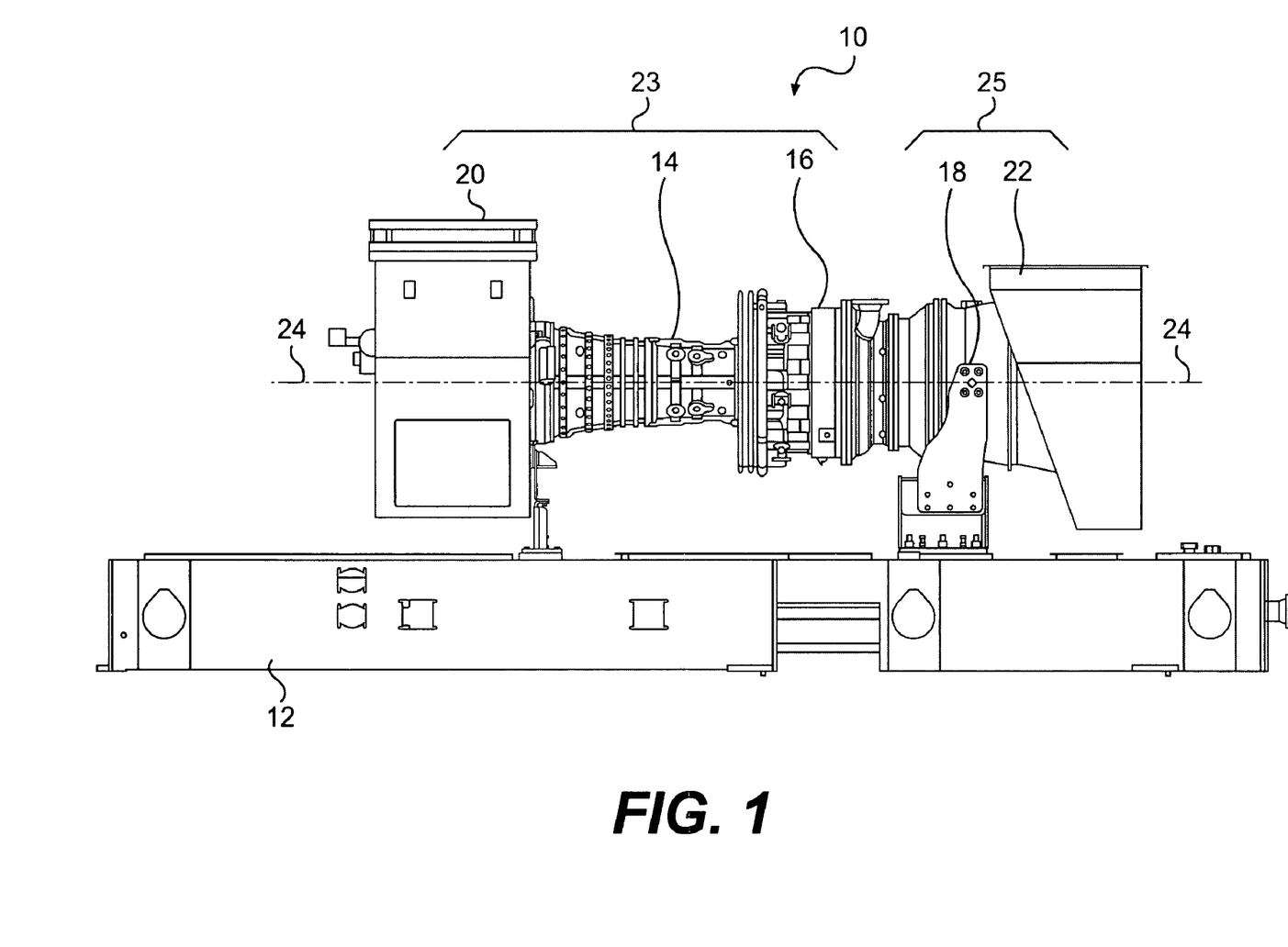
FIG. 1 is a diagrammatic illustration of a stationary support structuring including a GTE mounted thereon, in accordance with the present disclosure.

FIG. 1 illustrates a GTE 10 mounted on a stationary support structure 12, for example, during operation of GTE 10. GTE 10 may have a plurality of sections, including, for example, a compressor section 14, a combustor section 16, and a turbine section 18. GTE 10 may also include an air inlet duct 20 and an exhaust collector box 22. Compressor section 14, combustor section 16, and air inlet duct 20 may collectively define a gas producer group 23 of GTE 10. Turbine section 18 and exhaust collector box 22 may collectively define a turbine power group 25 of GTE 10.

During operation of GTE 10, compressor section 14 may draw air into GTE 10 through air inlet duct 20 and compress the air before it enters combustor section 16. The compressed air from compressor section 14 may mix with fuel and the air/fuel mixture may be ignited in combustor section 16. High pressure combustion gases generated by combustor section 16 may be sent through turbine section 18 to rotate turbine rotors (not shown) to provide rotary power. After passing through turbine section 18, the high pressure combustion gases generated by combustor section 16 may be directed into exhaust collector box 22, before being expelled to the atmosphere. Air inlet duct 20, compressor section 14, combustor section 16, turbine section 18, and exhaust collector box 22 may be aligned along a longitudinal axis 24.

One or more sections of GTE 10 may be removed from stationary support structure 12 and supported and transported on a modular engine cart 15. Modular engine cart 15 may have a plurality of possible alternative configurations including a first configuration for transporting one or more sections of GTE 10 (shown in FIGS. 2 and 3), a second configuration for transporting one or more sections of GTE 10 (shown in FIGS. 4 and 5), and a third configuration for transporting one or more sections of GTE 10 (shown in FIGS. 6 and 7).

Figure 2:
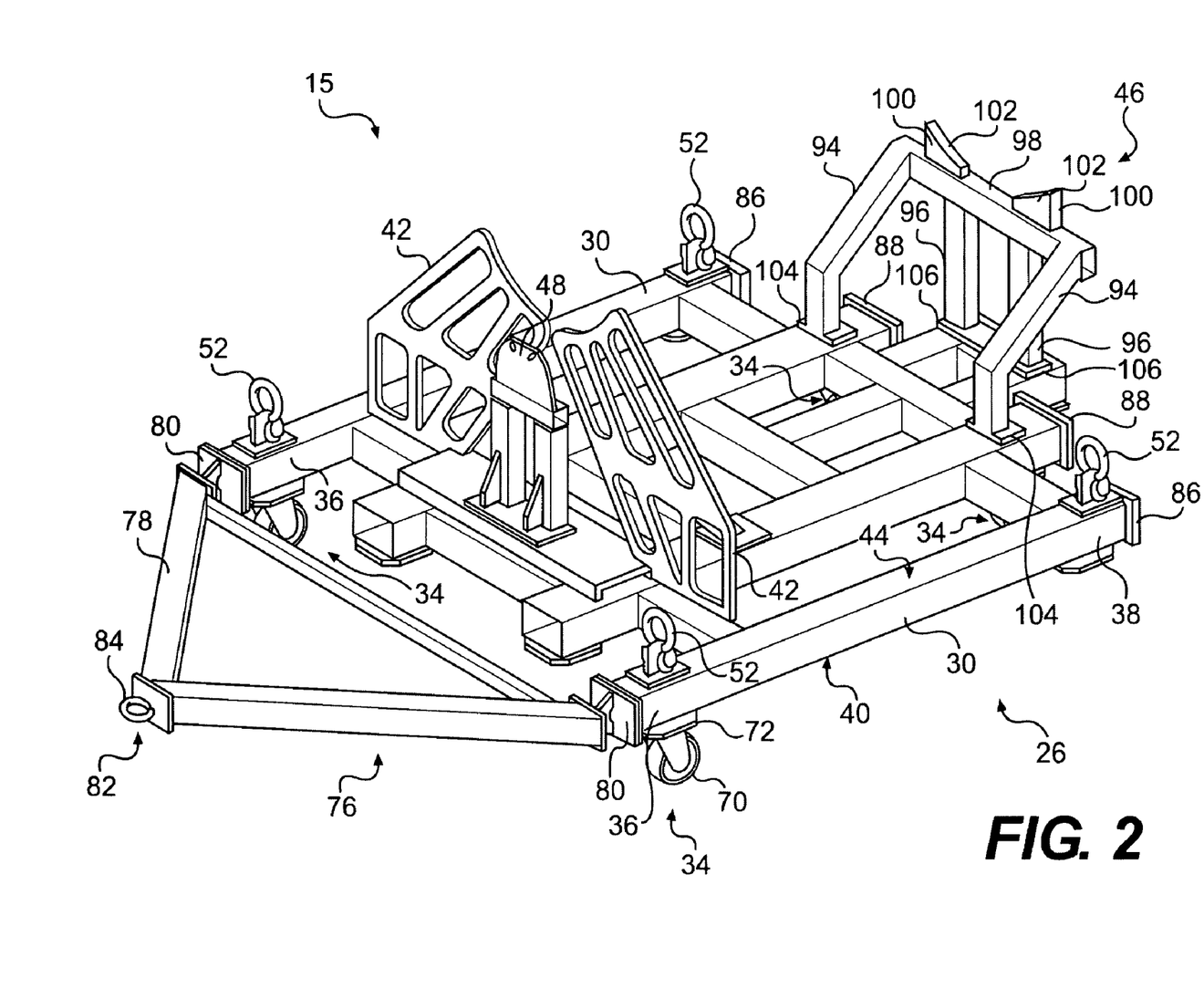
FIG. 2 is a diagrammatic illustration of a modular engine cart in an exemplary configuration including a first cart.
Figure 3:
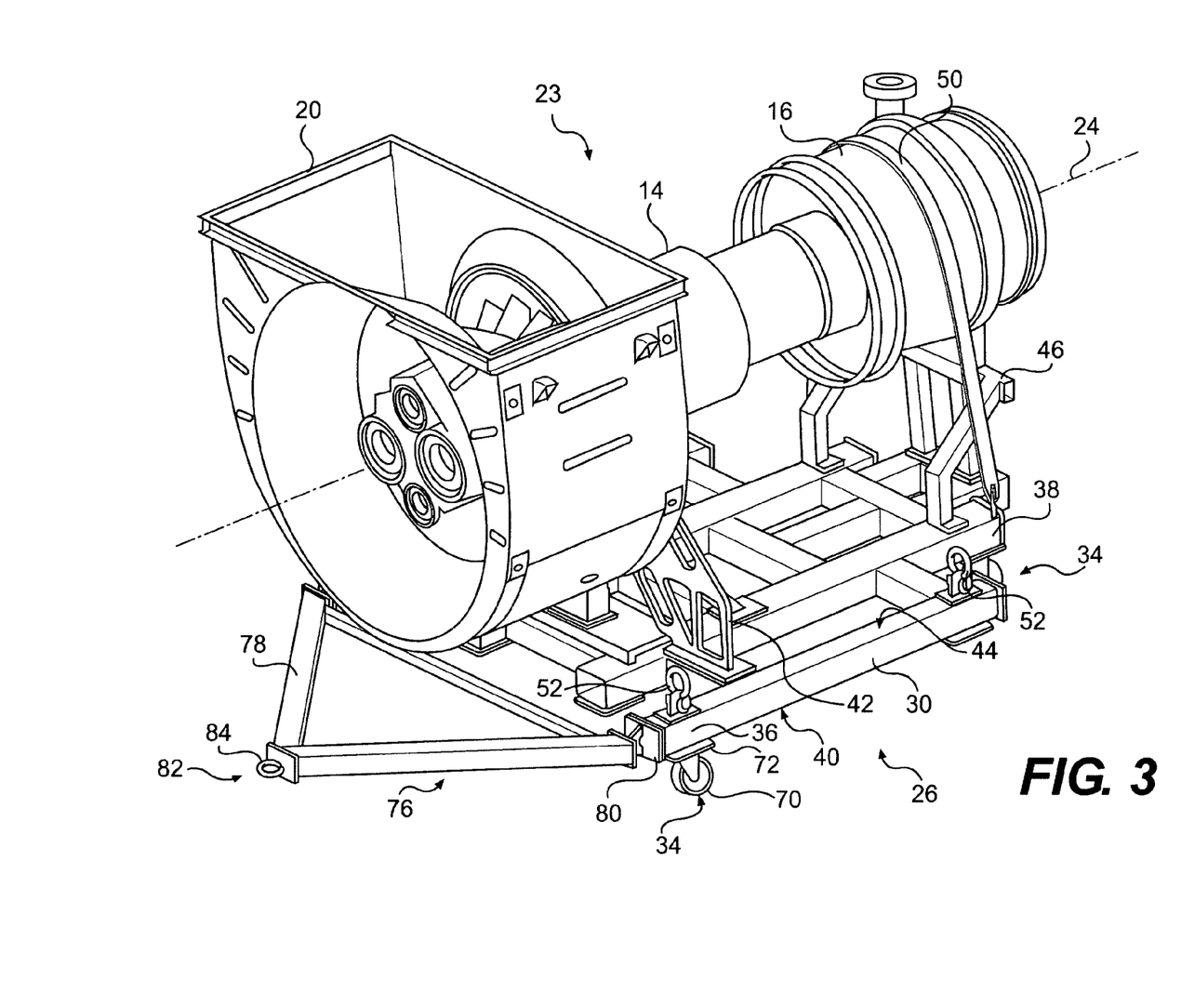
FIG. 3 is a diagrammatic illustration of the modular engine cart in the exemplary configuration of FIG. 2 supporting a gas producer group of the GTE mounted thereon.

FIGS. 2 and 3 show modular engine cart 15 arranged in the first configuration including a first cart 26 for supporting and transporting one or more sections of GTE 10. As shown in the exemplary embodiment of FIG. 3, modular engine cart 15 may support and transport gas producer group 23. First cart 26 may include a first frame structure 30 to provide structural rigidity to support the one or more sections of GTE 10, including, for example, transverse and longitudinal supports. Modular engine cart 15 may also include a plurality of wheel assemblies 34 for providing mobility to modular engine cart 15.

Figure 4:
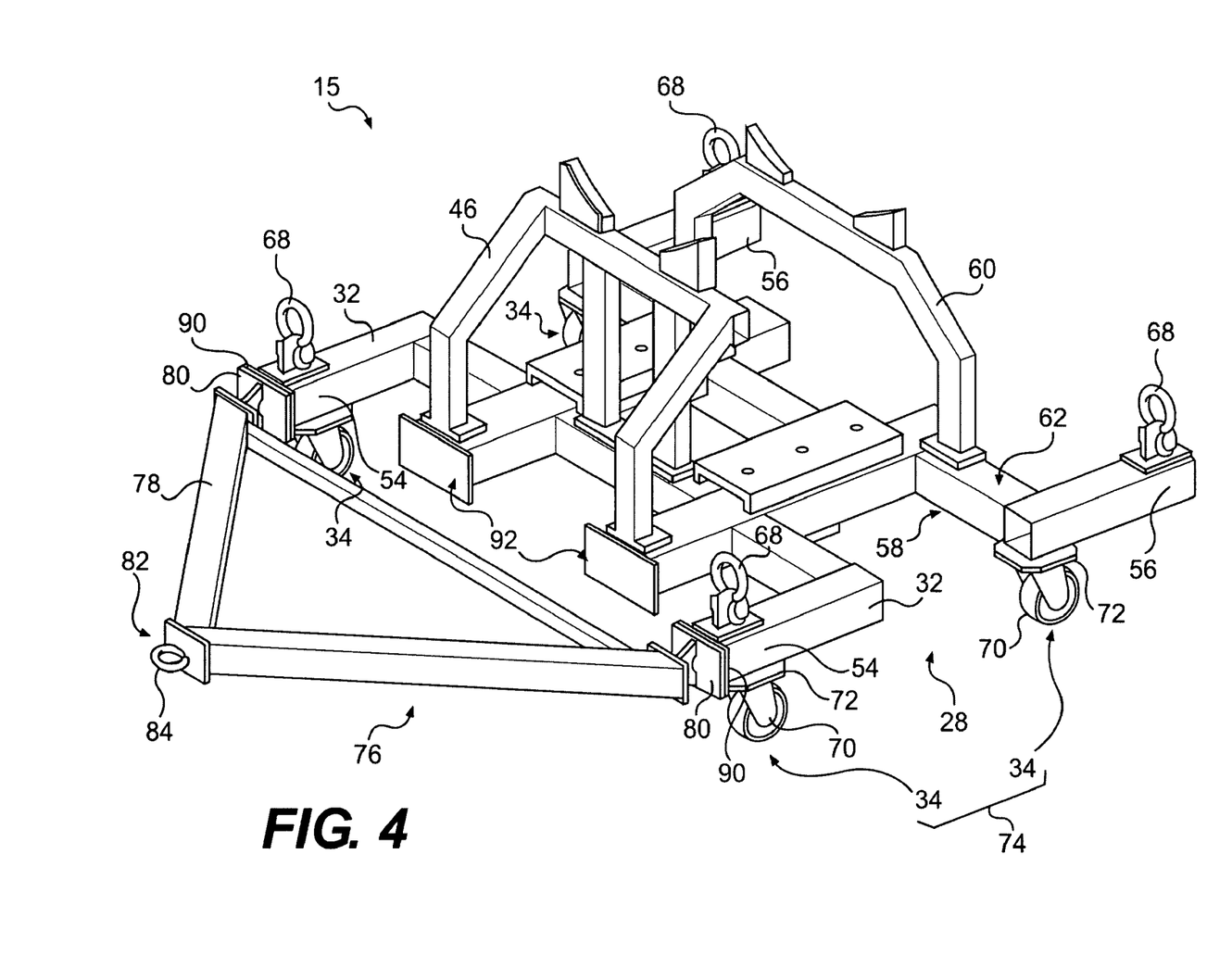
FIG. 4 is a diagrammatic illustration of the modular engine cart in another exemplary configuration including a second cart.

In the first configuration, modular engine cart 15 may utilize first cart 26 detached from a second cart 28 (shown in FIG. 4). First cart 26 may include a first end 36 spaced from a second end 38. At least one wheel assembly 34 may be positioned adjacent each of first end 36 and second end 38 of first cart 26. For example, two wheel assemblies 34 may be mounted to each of first end 36 and second end 38. It is contemplated that wheel assemblies 34 may be mounted to a lower surface 40 of first frame structure 30.

Modular engine cart 15 may also include one or more engine supports for supporting one or more sections of GTE 10. For example, a first engine support 42 may be mounted to an upper surface 44 of first frame structure 30 adjacent first end 36 to support at least one section of GTE 10. It is contemplated that first engine support 42 may at least partially support compressor section 14. A second engine support 46 may be mounted to upper surface 44 of first frame structure 30 adjacent second end 38 to support at least one section of GTE 10. With modular engine cart 15 arranged in the first configuration, second engine support 46 may at least partially support combustor section 16. It is contemplated that first engine support 42 and second engine support 46 may each be a cradle. First cart 26 may also include a third engine support 48 mounted to first frame structure 30, for example, to support air inlet duct 20. It is contemplated that first engine support 42, second engine support 46, and third engine support 48 may each be mounted to a respective mounting location on first frame structure 30 via any suitable means, for example, one or more fasteners (not shown).

As FIG. 3 shows, first cart 26 may also include one or more straps 50 to secure at least one section of GTE 10 to first cart 26. While only a single strap 50 is shown in FIG. 3, it is contemplated that any number of straps 50 may be used to secure GTE 10 to first cart 26. First cart 26 may also include one or more structural rings 52, for example, mounted on upper surface 44 to aid in transporting first cart 26. Structural rings 52 may be used by a hoist (not shown) to lift and position first cart 26. Alternatively, each structural ring 52 may be used as a tie-down point for securing first cart 26, for example, to a transport vehicle (not shown).

Figure 5:
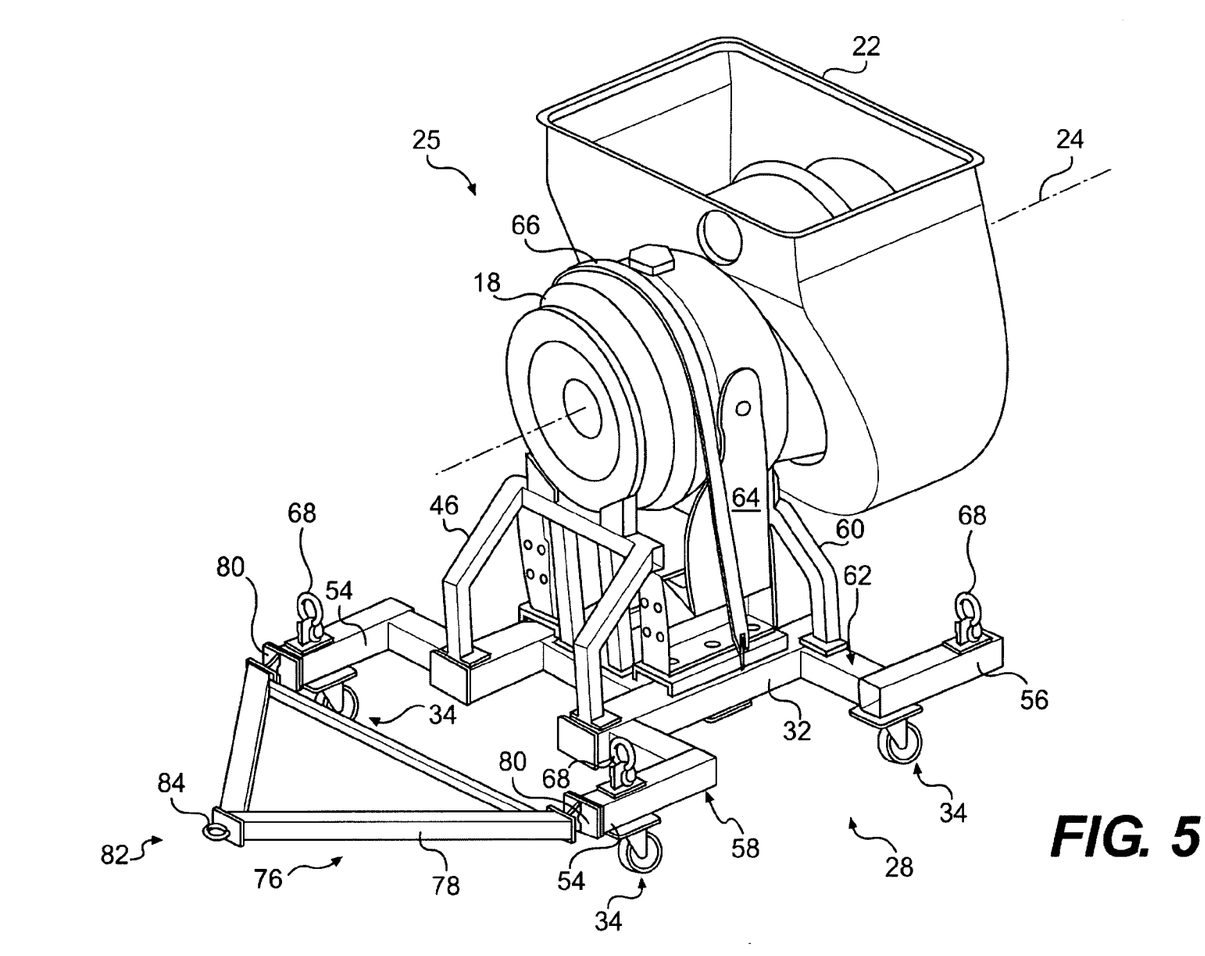
FIG. 5 is a diagrammatic illustration of the modular engine cart in the exemplary configuration of FIG. 4 with a turbine power group of the GTE mounted thereon.

FIGS. 4 and 5 show modular engine cart 15 arranged in the second configuration including second cart 28 for supporting and transporting one or more sections of GTE 10. As shown in the exemplary embodiment of FIG. 5, modular engine cart 15 may support and transport turbine power group 25. In the second configuration, modular engine cart 15 may utilize second cart 28 detached from first cart 26. Second cart 28 may include a first end 54 spaced from a second end 56. At least one wheel assembly 34 may be mounted adjacent each of first end 54 and second end 56. For example, two wheel assemblies 34 may be mounted to each of first end 54 and second end 56. It is contemplated that each wheel assembly 34 may be mounted to a lower surface 58 of second frame structure 32.

Second cart 28 may also include one or more engine supports. For example, a fourth engine support 60 may be mounted to an upper surface 62 of second frame structure 32 adjacent second end 56 to support at least one section of GTE 10. Fourth engine support 60 may be a cradle to at least partially support turbine section 18. Additionally, in the second configuration of modular engine cart 15, second engine support 46 may be mounted to second cart 28, rather than to first cart 26. More specifically, second engine support 46 may be mounted to upper surface 62 of second frame structure 32 adjacent first end 54 to support at least one section of GTE 10. For example, second engine support 46 may at least partially support turbine section 18. Alternatively, in lieu of sharing second engine support 46, second cart 28 may include a similar engine support (not shown) to second engine support 46 but designed to support a different size section of GTE 10. As shown in FIG. 5, second cart 28 may also include a fifth engine support 64 mounted to upper surface 62 of second frame structure 32. Fifth engine support 64 may also help support turbine section 18. It is contemplated that fifth engine support 64 may be a trunnion for supporting and permitting rotation of one or more sections of GTE 10. Second engine support 46, fourth engine support 60, and fifth engine support 64 may each be mounted to a respective mounting location on second frame structure 32 via any suitable means, for example, one or more fasteners (not shown).

As shown in FIG. 5, second cart 28 may also include one or more straps 66 to secure at least one section of GTE 10 to second cart 28. While only a single strap 66 is shown in FIG. 5, it is contemplated that any number of straps may be used to secure GTE 10 to second cart 28. Like first cart 26, second cart 28 may also include one or more structural rings 68, for example, mounted on upper surface 62 to aid in transporting second cart 28.

As shown in FIG. 4, each wheel assembly 34 may include a caster 70 attached to either lower surface 40 of first cart 26 or lower surface 58 of second cart 28 via a mounting plate 72. Each caster 70 may have the ability to swivel, lock, and/or adjust in height. In lieu of mounting each caster 70 to a corresponding mounting plate 72, each caster 70 may be mounted to first cart 26 or second cart 28 in any other suitable manner.

Modular engine cart 15 may include any suitable number of wheel assemblies 34 mounted in any suitable mounting locations to provide mobility. For example, it is contemplated that second cart 28 may utilize four wheel assemblies 34 with casters 70 to provide mobility, including two wheel assemblies 34 with casters 70 mounted adjacent first end 54 and two wheel assemblies 34 with casters 70 mounted adjacent second end 56. In some embodiments, modular engine cart 15 may include a wheel assembly group 74 that includes a set number of wheel assemblies 34 (e.g., four wheel assemblies 34) to be shared between the three configurations of modular engine cart 15. Each wheel assembly 34 may be removably mounted to modular engine cart 15, such that, each wheel assembly 34 may be shared between the various cart configurations. For example, when wheel assembly group 74 includes four wheel assemblies 34, modular engine cart 15 may include one wheel assembly 34 mounted at a mounting location adjacent each corner of each respective cart configuration.

As also shown in FIG. 4, modular engine cart 15 may also include a hitch assembly 76 configured to mount to either first cart 26 or second cart 28. Hitch assembly 76 may include a hitch frame 78 including, for example, a pair of hitch-mounting flanges 80 configured to mount to either first end 36 of first cart 26 or to first end 54 of second cart 28, via one or more fasteners (not shown). As an alternative to a flange connection, hitch assembly 76 may mount to modular engine cart 15 by any suitable connection type including, for example, telescopically connecting hitch assembly 76 within first or second frame structure 30, 32. Hitch assembly 76 may also include a hitching structure 82 opposite hitch-mounting flanges 80. It is contemplated that hitching structure 82 may include, for example, a ring 84, a hook (not shown), a ball (not shown), or any other suitable hitching structure 82 to permit hitch assembly 76 to mount to a corresponding hitch receiver (not shown) to push or pull modular engine cart 15.

Figure 6:
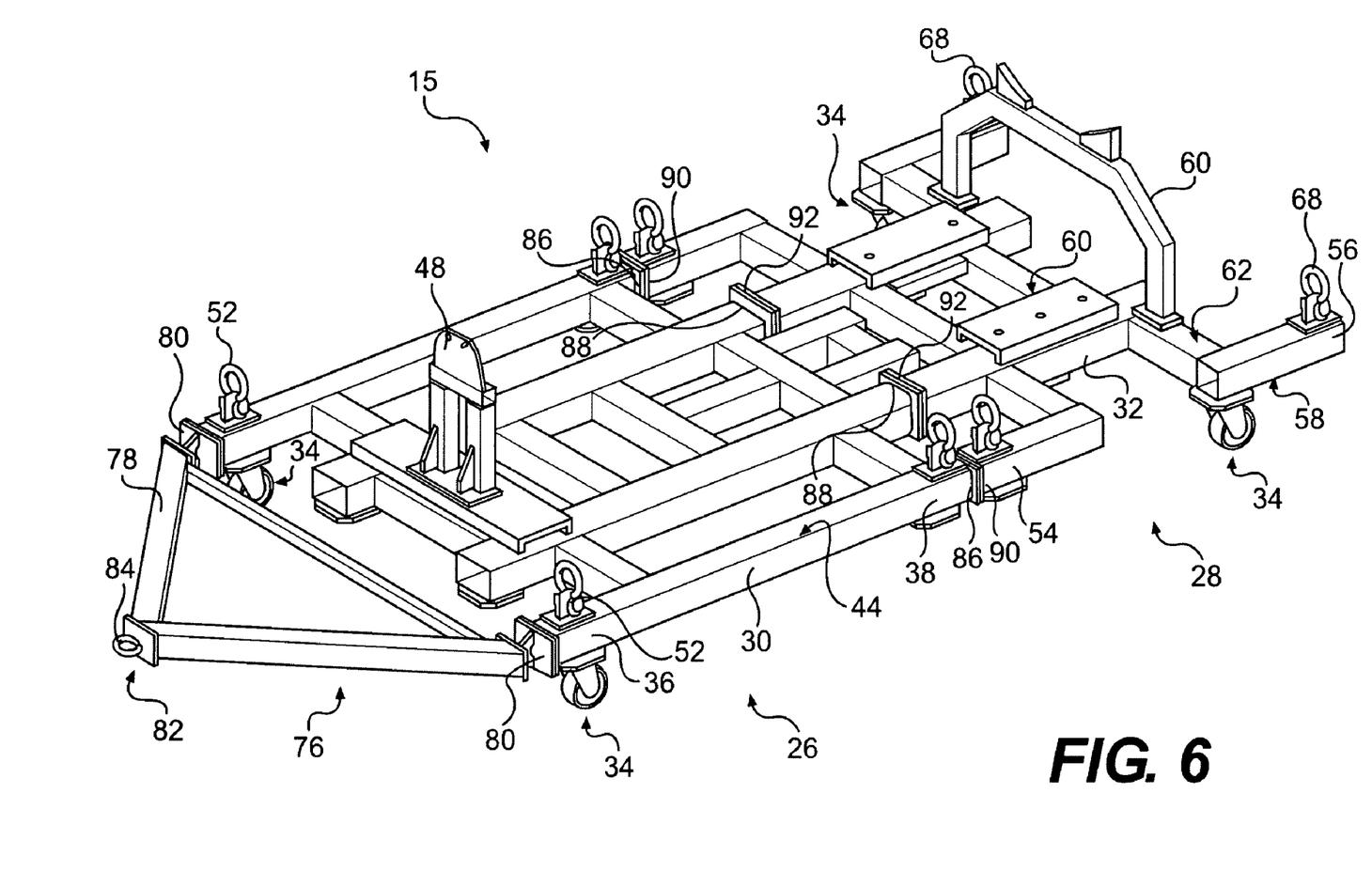
FIG. 6 is a diagrammatic illustration of the modular engine cart in another exemplary configuration including the first cart of FIG. 2 and the second cart of FIG. 4.
Figure 7:
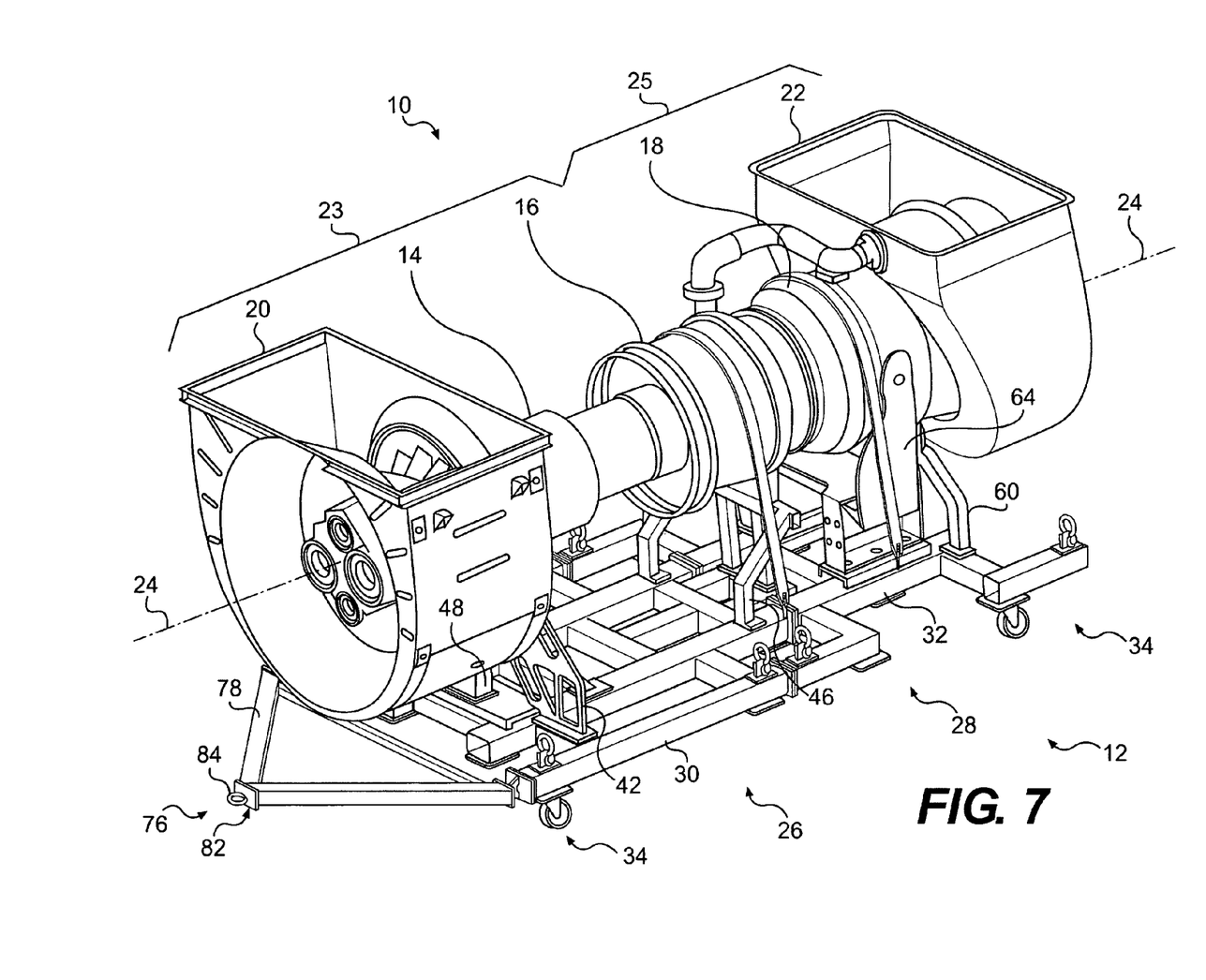
FIG. 7 is a diagrammatic illustration of the modular cart in the exemplary configuration of FIG. 6 with the gas producer group and the turbine power group of the GTE mounted thereon.

FIGS. 6 and 7 show modular engine cart 15 arranged in the third configuration including first cart 26 attached to second cart 28 for supporting and transporting one or more sections of GTE 10 on a combined cart (e.g., first cart 26 and second cart 28). As shown in the exemplary embodiment of FIG. 7, modular engine cart 15 may support and transport gas producer group 23 and turbine power group 25. The third configuration of modular engine cart 15 may be formed by attaching first cart 26 and second cart 28. More specifically, second end 38 of first cart 26 may attach to first end 54 of second cart 28. Second end 38 of first cart 26 may include a pair of first outer connection portions 86 and a pair of first inner connection portions 88. Likewise, first end 54 of second cart 28 may include a pair of second outer connection portions 90 and a pair of second inner connection portions 92. First outer and inner connection portions 86, 88 may each include flanges attached to first frame structure 30. Likewise, second outer and inner connection portions 90, 92 may each include flanges attached to second frame structure 32. Second outer connection portions 90 may be secured in abutment with the flanges of first outer connection portions 86. Similarly, second inner connection portions 92 may be secured in abutment with flanges of first inner connection portions 88. As an alternative to flange connections, first and second carts 26, 28 may be attached by any suitable connection type including, for example, a telescopic connection.

Various means may be used to attach first cart 26 and second cart 28 to one another in the third configuration of modular engine cart 15. In some embodiments, first outer and inner connection portions 86, 88 may be secured to second outer and inner connection portions 90, 92, respectively, via one or more fasteners (not shown). In other words, modular engine cart 15 may be formed in the third configuration by attaching first cart 26 to second cart 28 at four connection locations. While four connection locations are described and shown, any suitable number of connection locations to attach first cart 26 to second cart 28 may be implemented. Since inner connection portions 88 may extend beyond outer connection portions 86 in a direction toward second end 38 of first cart 26, at least a portion of first frame structure 30 of first cart 26 may overlap a portion second frame structure 32 of second cart 28 to provide increased structural rigidity to modular engine cart 15 when first cart 26 and second cart 28 are attached in the third configuration. In other words, first outer connection portions 86 may connect to second outer connection portions 90 along a first vertical plane, and first inner connection portions 88 may connect to second inner connection portions 92 along a second vertical plan that is longitudinally offset from the first vertical plane. In the second configuration, second outer connection portions 90 may also be used to mount hitch assembly 76 to second cart 28 via hitch-mounting flanges 80.

Similar to the first and second configurations, the third configuration of modular engine cart 15 may include cart components mounted to first cart 26 and second cart 28. For example, in the third configuration, modular engine cart 15 may include wheel assembly group 74 (e.g., four wheel assemblies 34), one or more engine supports (e.g., first engine support 42, second engine support 46, third engine support 48, fourth engine support 60, and fifth engine support 64); one or more straps 50, 66; one or more structural rings 52, 68; and hitch assembly 76. It is contemplated that in the third configuration, one wheel assembly 34 may be mounted to modular engine cart 15 at a mounting location adjacent each corner of modular engine cart 15. As shown in FIG. 7, the third configuration of modular engine cart 15 may include first, second, and third engine supports 42, 46, and 48 mounted at mounting locations on first cart 26, and fourth and fifth engine supports 60, 64 mounted on second cart 28. As in the first configuration, hitch assembly 76 may mount to first end 36 of first cart 26 when modular engine cart 15 is assembled in the third configuration.

As best shown in FIG. 2, second engine support 46 may include a pair of angled stanchions 94 and a pair of vertical stanchions 96. Each pair of stanchions 94, 96 may be connected to a cross brace 98. Cross brace 98 may include a curved support 100, for example, defined by two curved support surfaces 102 for supporting either combustor section 16 when modular engine cart 15 is assembled in the first and third configurations or turbine section 18 when modular engine cart 15 is assembled in the second configuration. It is contemplated that second engine support 46 may be designed to accommodate various size sections of GTE 10. For example, curved supports 100 may be spaced closer together to support a smaller section of GTE 10, and curved supports 100 may be spaced farther apart to support a larger section of GTE 10.

In the first and third configurations, mounting ends 104 of angled stanchions 94 and mounting ends 106 of vertical stanchions 96 may be mounted, for example, to upper surface 44 of first frame structure 30 on first cart 26. Alternatively, in the second configuration, mounting ends 104 of angled stanchions 94 and mounting ends 106 of vertical stanchions 96 may be mounted to upper surface 62 of second frame structure 32 on second cart 28. That is, modular engine cart 15 may include at least two mounting locations for second engine support 46, including a first mounting location on first cart 26 and a second mounting location on second cart 28. In the third configuration, it is also contemplated that modular engine cart 15 may include a third mounting location for second engine support 46, such as a mounting location in which second engine support 46 may straddle first cart 26 and second cart 28. Second engine support 46 may straddle first cart 26 and second cart 28 to provide increased structural rigidity to modular engine cart 15 and to balance the load supported between first cart 26 and second cart 28. For example, mounting ends 104 of angled stanchions 94 may be mounted to first cart 26 and mounting ends 106 of vertical stanchions 96 may be mounted to second cart 28. First engine support 42, third engine support 48, fourth engine support 60, and fifth engine support 64 may also be mounted at various positions on modular engine cart 15, for example, to provide versatility for transporting GTEs 10 with varying characteristics.

Modular engine cart 15 may share one or more of the cart components including, for example, wheel assemblies 34; engine supports (e.g., first engine support 42, second engine support 46, third engine support 48, fourth engine support 60, and fifth engine support 64); hitch assembly 76; straps 50, 66; and structural rings 52, 68, in each of the cart configurations. It is contemplated that first cart 26 and second cart 28 may each include one or more mounting locations for receiving the cart components when first cart 26 and second cart 28 are detached in either the first or second configurations. It is also contemplated that first cart 26 and second cart 28 may also include one more additional mounting locations for receiving the cart components when first cart 26 and second cart 28 are attached in the third configuration. Each of the cart components may be mounted to a corresponding mounting location on either first cart 26 or second cart 28 by one or more fasteners (not shown) that may permit the cart components to be interchangeable between the cart configurations.

INDUSTRIAL APPLICABILITY

The disclosed modular engine cart may be applicable to transport any modular engine, for example, a GTE. The disclosed modular engine cart may share cart components among a plurality of alternative configurations of the modular engine cart. The operation of modular engine cart 15 will now be described.

One or more sections of GTE 10 may need to be transported from a first location to a second location. GTE 10 may be transported as a substantially complete engine (e.g., including compressor section 14, combustor section 16, and turbine section 18), for example, during initial installation. Alternatively, in lieu of transporting all sections of GTE 10 assembled, sections of GTE 10 may be separated from one another on stationary support structure 12 and one or more sections (e.g., turbine section 18) or one or more groups (e.g., turbine power group 25) may be transferred from stationary support structure 12 to modular engine cart 15. In order to transport GTE 10 in various assembly configurations, modular engine cart 15 may be arranged in a plurality of corresponding configurations, including the first configuration implementing first cart 26 detached from second cart 28 for transporting one or more sections of GTE 10 (shown in FIGS. 2-3), the second configuration implementing second cart 28 detached from second cart 28 for transporting one or more sections of GTE 10 (shown in FIGS. 4-5), and the third configuration implementing first cart 26 attached to second cart 28 for transporting one or more sections of GTE 10 (shown in FIGS. 6-7).

As shown in FIGS. 2 and 3, modular engine cart 15 may be arranged in the first configuration utilizing first cart 26, detached from second cart 28, to support one or more sections of GTE 10. In the first configuration, various cart components may be mounted to a mounting location on first cart 26 to increase its mobility and/or versatility including, for example, wheel assembly group 74 (e.g., four wheel assemblies 34), second engine support 46, and hitch assembly 76.

With modular engine cart 15 arranged in the first configuration (shown in FIG. 2), one or more sections of GTE 10 may be separated from other sections of GTE 10 and removed from an operation location on stationary support structure 12 and transferred to modular engine cart 15. For example, combustion section 16 may be separated from turbine section 18. It is contemplated that one or more sections of GTE 10 may be transferred from stationary support structure 12 to modular engine cart 15 by any suitable mechanism, for example, a hoist. As shown in FIG. 3, for example, gas producer group 23 (e.g., compressor section 14, combustor section 16, and air inlet duct 20) may be supported on first engine support 42, second engine support 46, and third engine support 48. Further, gas producer group 23 may be secured to first cart 26 via strap 50 for transport.

As shown in FIGS. 4 and 5, modular engine cart 15 may be arranged in the second configuration utilizing second cart 28, detached from first cart 26, to support one or more sections of GTE 10. As in the first configuration, cart components may be mounted to second cart 28 in the second configuration to increase mobility or versatility including, for example, wheel assembly group 74 (e.g., four wheel assemblies 34), second engine support 46, and hitch assembly 76.

In some circumstances, there may arise a need to transport one or more sections of GTE 10 for which the second configuration (shown in FIGS. 4 and 5) of modular engine cart 15 is better suited than the first configuration (shown in FIGS. 2 and 3) of modular engine cart 15. To transition modular engine cart 15 from its first configuration to its second configuration in such circumstances, certain cart components of modular engine cart 15 may be transferred from first cart 26 to second cart 28. For example, wheel assembly group 74 may be removed from a mounting location on first cart 26 and mounted to a mounting location on second cart 28. Additionally, hitch assembly 76 may be removed from a mounting location on first end 36 of first cart 26 and mounted to a mounting location on first end 54 of second cart 28 via one or more fasteners (not shown). Further, one or more engine supports may each be removed from a mounting location on first cart 26 and mounted to mounting location on second cart 28. For example, second engine support 46 may be removed from first frame structure 30 and mounted to second frame structure 32. If it is desired to transition modular engine cart 15 from its second configuration to its first configuration, these cart component transfers may be reversed.

When arranged in its second configuration, modular engine cart 15 may also be used to support one or more sections of GTE 10, which may be different sections of GTE 10 than those that the first configuration of modular engine cart 15 is used to support. For example, combustion section 16 may be separated from turbine section 18. As shown in FIG. 5, for example, turbine power group 25 (e.g., turbine section 18 and exhaust collector box 22) may be mounted on second engine support 46, fourth engine support 60 and fifth engine support 64. Further, turbine power group 25 may be secured to second cart 28 by strap 66.

In some circumstances, there may arise a need to transport one or more sections of GTE 10 for which the third configuration (shown in FIGS. 6 and 7) of modular engine cart 15 is better suited than either the first configuration (shown in FIGS. 2 and 3) or the second configuration (shown in FIGS. 4 and 5) of modular engine cart 15. In such circumstances, modular engine cart 15 may be converted from the either the first or second configuration to a combined cart of the third configuration by bringing together and rearranging cart components from the first and second configurations. For purposes of discussion, the following description outlines a transition from the second configuration to the third configuration. In order to convert modular engine cart 15 in the third configuration, first cart 26 may be attached to second cart 28 at connection portions 86, 88, 90, 92 via one or more fasteners. Additionally, hitch assembly 76 may be removed from a mounting location on first end 54 of second cart 28 and attached to a mounting location on first end 36 of first cart 26. Furthermore, second engine support 46 may be removed from a mounting location on upper surface 62 of second cart 28 and mounted to a mounting location on upper surface 44 of first cart 26.

The mounting locations of wheel assemblies 34 of wheel assembly group 74 on modular engine cart 15 may also be changed in the transition from the second configuration to the third configuration. For example, at least one wheel assembly 34 may be removed from second cart 28 and mounted to first cart 26. In the third configuration, it is contemplated that two wheel assemblies 34 may be mounted adjacent first end 36 of first cart 26 and two wheel assemblies 34 may be mounted adjacent second end 56 of second cart 28.

Once assembled in the third configuration, modular engine cart 15 may be able to support one or more sections of GTE 10. As shown in FIG. 7, for example, compressor section 14, combustor section 16, air inlet duct 20, turbine section 18, and exhaust collector box 22 may be mounted on engine supports 42, 46, 48, 60, and 64. Further, those portions of GTE 10 on modular engine cart 15 may be secured thereto via one or more straps 50, 66. Modular engine cart 15 may also be rearranged from the third configuration to either the first configuration or the second configuration by detaching the first cart 26 from the second cart 28 and, for example, rearranging the cart components (e.g., wheel assemblies 34, second engine support 46, and hitch assembly 76). Further, when modular engine cart 15 is rearranged from the third configuration to either the first or second configurations, it is contemplated that one or more sections of GTE 10 supported on modular engine cart 15 may be removed from modular engine cart 15 before detaching first cart 26 and second cart 28.

Modular engine cart 15 may be transported in a substantially fixed position for long range transport on a deck of a transport vehicle, for example, on a ship deck or on a train car. In order to move modular engine cart 15 into position on the transport vehicle, wheel assemblies 34 may be removed from modular engine cart 15 to reduce mobility, and structural rings 52, 68 may be used by a hoist mechanism (not shown) to help position modular engine cart 15. Once modular engine cart 15 is in place on the transport vehicle, structural rings 52, 68 may be used as tie-down points to secure modular engine cart 15 for transport.

Since modular engine cart 15 may allow GTE 10 to be efficiently shipped in various configurations, modular engine cart 15 may reduce costs associated with shipping GTE 10. Further, sharing interchangeable cart components amongst the various cart configurations of modular engine cart 15 may reduce cart component costs associated with modular engine cart 15.

It will be apparent to those skilled in the art that various modifications and variations can be made to the disclosed modular engine cart without departing from the scope of the disclosure. Other embodiments of the modular engine cart will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A modular cart for a gas turbine engine including a first section operatively coupled to a second section, the modular cart comprising:

a first cart adapted to support and transport the first section separate from the second section, the first cart including at least one pair of first connection portions and a first mounting location for an engine support structure;

a second cart adapted to support and transport the second section separate from the first section, the second cart including at least one pair of second connection portions and a second mounting location for the engine support structure, the at least one pair of first connection portions of the first cart being removably coupled to the at least one pair of second connection portions of the second cart to support and transport the gas turbine engine as one single unit; and the engine support structure configured to be interchangeably coupled to the first mounting location of the first cart or the second mounting location of the second cart and being coupled to one of the first mounting location or the second mounting location.

2. The modular cart of claim 1, wherein the cart component includes a wheel assembly group having a plurality of wheel assemblies.

3. The modular cart of claim 2, wherein the plurality of wheel assemblies includes four wheel assemblies, and two wheel assemblies are mounted to each of the first cart and the second cart when the first cart is attached to the second cart.

4. The modular cart of claim 1, wherein the first cart includes a first engine support structure and the second cart includes a second engine support structure different from the first engine support structure.

5. The modular cart of claim 1, wherein the first cart includes a first frame structure and the second cart includes a second frame structure shaped differently from the first frame structure, and the first frame structure at least partially overlaps the second frame structure when the first cart is attached to the second cart.

6. The modular cart of claim 1, wherein the first section of the gas turbine engine includes at least one of a compressor section and a combustor section.

7. The modular cart of claim 6, wherein the second section of the gas turbine engine includes at least one of a combustor section and a turbine section.

8. The modular cart of claim 7, wherein the first section of the gas turbine engine and the second section of the gas turbine engine include at least two of a compressor section, a combustor section, and a turbine section.

9. A method of transporting a gas turbine engine, the gas turbine engine including a first section separable from a second section, the method comprising:

providing a first cart configured to transport the first section separate from the second section;

providing a second cart having a shape different from the first cart, the second cart being configured to transport the second section separate from the first section;

creating a combined cart by coupling a first end of the first cart to a second end of the second cart such that relative motion between the first end of the first cart and the second end of the second cart is substantially prevented; and transporting the gas turbine engine with the first section coupled to the second section as one single unit on the combined cart.

10. The method of claim 9, further including sharing at least one cart component between the first cart and the second cart when the first cart is detached from the second cart.

11. The method of claim 10, wherein sharing at least one cart component includes sharing at least one of a wheel assembly, an engine support, and a hitch assembly.

12. The method of claim 9, further including detaching the first cart from the second cart; transporting the first section of the gas turbine engine on the first cart; and transporting the second section of the gas turbine engine on the second cart.

13. The method of claim 9, wherein creating a combined cart includes overlapping a first frame structure of the first cart with a second frame structure of the second cart.

14. A method of constructing a modular cart configured to transport a gas turbine engine having a first part coupled to a second cart, comprising:
providing a first cart configured to transport the first section separate from the second section, the first cart including one or more engine support structures that are adapted to support the first section;
providing a second cart configured to transport the second section separate from the first section, the second cart having a shape different from a shape of the first cart and including at least one engine support structure different from the one or more engine support structures of the first cart;
constructing the modular cart by coupling a first end of the first cart to a second end of the second cart such that relative motion between the first end and the second end is substantially prevented.

15. The method of claim 14, wherein constructing the modular cart further includes coupling at least a pair of connection portions on the first cart to at least a pair of mating connection portions on the second cart.

16. The method of claim 15, wherein coupling at least a pair of connection portions includes coupling an inner pair of connection portions on the first cart to a mating inner pair of connection portions on the second cart at a first location, and coupling an outer pair of connection portions on the first cart to a mating outer pair of connection portions on the second cart at a second location longitudinally displaced from the first location.

17. The modular cart of claim 1, wherein the at least one pair of first connection portions include an inner pair of first connection portions and an outer pair of first connection portions, and the at least one pair of second connection portions include an inner pair of second connection portions and an outer pair of second connection portions.

18. The modular cart of claim 17, wherein the inner pair of first connection portions of the first cart connects to the inner pair of second connection portions of the second cart along a first vertical plane and the outer pair of first connection portions of the first cart connects to the outer pair of second connections of the second cart along a second vertical plane longitudinally offset from the first vertical plane.

19. The modular cart of claim 1, wherein the at least one pair of first connection portions is coupled to the at least one pair of second connection portions to join a first end of the first cart to a second end of the second cart such that relative motion between the first end and the second end is substantially prevented.

20. The modular cart of claim 1, wherein both the first cart and the second cart include one or more structural rings coupled thereto, wherein the structural rings are adapted to be used by a hoist to lift and position the first cart and the second cart.

* * * * *